US005141837A

United States Patent [19]

Nguyen et al.

[11] Patent Number: 5,141,837

[45] Date of Patent: Aug. 25, 1992

[54] METHOD FOR PREPARING COATING COMPOSITIONS CONTAINING PHOTOCONDUCTIVE PERYLENE PIGMENTS

[75] Inventors: Khe C. Nguyen, Pittsford; William T. Gruenbaum, Rochester, both of N.Y.

[73] Assignee: Eastman Kodak Company, Rochester, N.J.

[21] Appl. No.: 485,112

[22] Filed: Feb. 23, 1990

[51] Int. Cl.[5] .................... G03G 5/00; C09B 6; B02C 4/04

[52] U.S. Cl. .................... 430/135; 106/412; 241/27

[58] Field of Search .................. 430/127, 135; 241/27; 106/412, 493, 498

[56] References Cited

U.S. PATENT DOCUMENTS

| | | | |
|---|---|---|---|
| 3,752,686 | 8/1973 | Kalz et al. . | |
| 4,262,851 | 4/1981 | Graser et al. | 106/498 X |
| 4,555,467 | 11/1985 | Hasegawa et al. . | |
| 4,578,334 | 3/1986 | Borsenberger et al. . | |
| 4,714,666 | 12/1987 | Wiedemann et al. . | |
| 4,769,460 | 9/1988 | Spietschka et al. | 524/90 X |
| 4,792,508 | 12/1988 | Kazmaier et al. . | |

FOREIGN PATENT DOCUMENTS

| | | | |
|---|---|---|---|
| 0254923 | 9/1960 | Australia | 106/493 |

*Primary Examiner*—Marion E. McCamish
*Assistant Examiner*—S. C. Crossan
*Attorney, Agent, or Firm*—Bernard D. Wiese; Alfred P. Lorenzo

[57] ABSTRACT

An electrophotographic coating composition comprising finely-divided photoconductive perylene pigment dispersed in a solvent solution of polymeric binder is prepared by the steps of (1) milling a perylene pigment with milling media comprising inorganic salt and non-conducting particles under shear conditions in the substantial absence of the solvent to provide pigment having a particle size up to 0.2 micrometer, (2) continuing the milling at higher shear at a temperature up to about 50° C., to achieve a perceptible color change of the pigment particles, (3) rapidly reducing the temperature of the milled pigment by at least 10° C., (4) separating the milled pigment from the media and (5) mixing the milled pigment with the solvent solution of polymeric binder to form the coating composition. A very high degree of dispersion of photoconductive perylene pigment in solvent solution of polymeric binder is achieved by this method.

16 Claims, No Drawings

METHOD FOR PREPARING COATING COMPOSITIONS CONTAINING PHOTOCONDUCTIVE PERYLENE PIGMENTS

FIELD OF THE INVENTION

This invention relates to electrophotographic coating compositions in general and particularly to a method of making electrophotographic coating compositions comprising photoconductive perylene pigments. More particularly, the invention relates to a method of making an electrophotographic coating composition comprising a stable dispersion of finely-divided perylene pigment dispersed in a solvent solution of polymeric binder. Such dispersions form layers that exhibit unexpectedly good photosensitivity and high resistance to abrasion, and are characterized by good durability.

BACKGROUND

In electrophotography an image comprising an electrostatic field pattern, usually of non-uniform strength (also referred to as an electrostatic latent image), is formed on an insulative surface of an electrophotographic element comprising at least a photoconductive layer and an electrically conductive substrate. The electrostatic latent image is usually formed by imagewise radiation-induced dissipation of the strength of portions of an electrostatic field of uniform strength previously formed on the insulative surface. Typically, the electrostatic latent image is then developed into a toner image by contacting the latent image with an electrographic developer. If desired, the latent image can be transferred to another surface before development.

In latent image formation the imagewise radiation-induced dissipation of the initially uniform electrostatic field is brought about by the creation of electron/hole pairs, which are generated by a material, often referred to as a photoconductive or charge-generation material, in the electrophotographic element in response to exposure to imagewise actinic radiation. Depending upon the polarity of the initially uniform electrostatic field and the types of materials included in the electrophotographic element, part of the charge that has been generated, i.e., either the holes or the electrons, migrates toward the charged insulative surface of the element in the exposed areas and thereby causes the imagewise dissipation of the initial field. What remains is a non-uniform field constituting the electrostatic latent image.

Several types of electrophotographic recording elements are known for use in electrophotography. In many conventional elements, the active photoconductive or charge-generation materials are contained in a single layer. This layer is coated on a suitable electrically conductive support or on a non-conductive support that is overcoated with an electrically conductive layer. In addition to single-active-layer electrophotographic recording elements, various multi-active electrophotographic recording elements are known. Such elements are sometimes called multi-layer or multi-active-layer elements because they contain at least two active layers that interact to form an electrostatic latent image.

A class of photoconductive materials useful in the aforementioned single-active-layer and multiactive elements is the class of perylene pigments, particularly perylene-3,4,9,10-tetracarboxylic acid imide derivatives. Representative examples of patents pertaining to such perylene photoconductive pigments include, U.S. Pat. No. 4,578,334, issued Mar. 25, 1986, which describes multi-active electrophotographic recording elements that contain, as photoconductive materials, certain crystalline forms of N,N'-bis(2-phenethyl)perylene-3,4:9,10-bis(dicarboximide) characterized by particular spectral absorption and x-ray diffraction characteristics; U.S. Pat. No. 4,714,666, issued Dec. 22, 1987, which describes single-active-layer electrophotographic elements and multi-active elements containing, as photoconductive materials, asymmetrically substituted perylene-3,4,9,10-tetracarboxylic acid imide derivatives, and U.S. Pat. No. 4,792,508, issued Dec. 20, 1988, which describes multi-active elements that contain as photoconductive materials, mixtures of cis- and trans-naphthimidazole perylenes.

Unfortunately, electrophotographic recording elements of the prior art which contain photoconductive perylene materials have typically suffered from one or more disadvantages that have significantly restricted their use. For example, vacuum sublimation is frequently required to deposit photoconductive perylene pigments in a crystal form suitable for high speed electrophotographic elements. Thus, U.S. Pat. No. 4,578,334 describes a process wherein a perylene pigment is deposited by vacuum sublimation in the form of an amorphous layer and is thereafter converted to the photoconductive crystalline form by contacting the layer with an appropriate liquid composition. Vacuum sublimation, however, is a batch process which makes production scale runs quite costly and thin sublimed films are fragile and susceptible to damage until they can be protected by a more durable overcoat.

To avoid the disadvantages inherent in forming photoconductive perylene pigment layers using vacuum sublimation techniques and the fragile nature of such layers; electrophotographic layers have been coated from liquid coating compositions comprising finely-divided photoconductive perylene pigments in solvent solutions of polymeric binders, as described, for example, in U.S. Pat. No. 4,714,666. To achieve acceptable electrophotographic speed with such a coating it is necessary that the perylene pigment be in a form (crystalline or amorphous) that is highly photoconductive and sufficiently and stably dispersed in the coating composition to permit it to be applied at a low enough concentration to form a very thin layer having high electrophotographic speed. Forming such photoconductive perylene pigments and dispersing the pigment particles to the necessary degree is extremely difficult. Thus, forming highly stable dispersions of photoconductive perylene pigments in liquid coating compositions is not easily achieved with conventional procedures. Such conventional procedures normally involve simply mixing the components of a liquid coating composition, e.g., a dispersion of photoconductive perylene pigment in a solvent solution of polymeric binder, in a suitable mixing device such as a ball mill or a paint shaker. Unfortunately, such procedures do not adequately disperse the pigment particles and frequently particle agglomerates are formed in the coated layers. Such agglomerates detrimentally affect the image quality of copies formed with electrophotographic elements containing such layers. Furthermore, prolonged mixing of the photoconductive perylene pigment in a device such as a ball mill can damage the pigment structurally so that electrophotographic performance is detrimentally affected.

From the foregoing discussion, it is evident that a method that is capable of providing finely-divided photoconductive perylene pigments that have excellent sensitometric characteristics and form stable dispersions would represent a significant advance in the art. Likewise, it is evident that a method for preparing electrophotographic coating compositions that have finely-divided photoconductive perylene pigments dispersed in a solvent solution of polymeric binder and can be used to form high speed electrophotographic layers without requiring sublimation coating techniques would also represent such an advance. It is an objective of this invention to provide a novel method that will achieve such advances in the art.

SUMMARY OF THE INVENTION

In accordance with this invention a crude perylene pigment is subjected to a milling method that reduces its particle size and yields a pigment having a crystal form and structure usable in practical modern-day electrophotographic applications. Thus, an electrophotographic coating composition having finely-divided photoconductive pigment dispersed in a solvent solution of polymeric binder is prepared by a method comprising:

(1) milling under shear conditions in the substantial absence of the solvent, (a) a crude perylene pigment with (b) milling media comprising inorganic salt and non-conducting particles in a weight ratio of about 0.5:1 to 3:1 to provide perylene pigment having an average particle size up to about 0.2 micrometer, (2) continuing the milling at higher shear and at a temperature up to about 50° C. to achieve a perceptible color change of the pigment, (3) rapidly reducing the temperature of the milled pigment by at least 10° C., (4) separating the milled pigment from the media, and (5) mixing the milled pigment with the solvent solution of polymeric binder to form the coating composition.

The electrophotographic coating compositions prepared by the method of this invention are stable, uniform dispersions that can be coated to provide electrophotographic elements having excellent photosensitivity, for example, photodischarge speed and dark decay, without the need for vacuum sublimation techniques. Furthermore, electrophotographic elements prepared using such coating compositions exhibit a broad range of sensitivity, e.g., they exhibit electrophotographic response over the visible region of the spectrum (400–700 nm), and in some cases out into the infrared region, and often exhibit an unexpected increase in electrophotographic response at all wavelengths within such regions.

DESCRIPTION OF THE PREFERRED EMBODIMENTS

The method of this invention is broadly useful for preparing coating compositions intended for any end use, for example, in the manufacture of single-active layer or multi-active layer electrophotographic recording elements. However, it is especially useful in the manufacture of the multi-active layer elements and, for convenience, will be described specifically in the Examples in connection with the manufacture of such elements.

The crude perylene pigment used in the method of this invention is an as-synthesized pigment and has a much larger particle size than does the electrophotographic quality pigment, i.e., the photoconductive perylene pigment. Also, perylene pigments are known to exhibit polymorphism, i.e., they are capable of existing in various crystal forms, as well as amorphous forms. The method of this invention provides a perylene pigment that is in a finely-divided photoconductive form capable of achieving a high degree of dispersion in electrophotographic coating compositions. Such pigment particles have a very uniform size distribution and the size of the individual particles do not exceed 0.2 micrometer. While the exact mechanism whereby the process functions to achieve the improved results is not known with certainty, in the method of the invention, the solvent and polymeric binder are not brought into association with the pigment particles until such particles are finely-divided and free from agglomerates. Accordingly, any adverse influences due to the presence of polymeric binder and/or solvent on the formation of finely-divided particles and breaking up of agglomerates and dispersion of individual particles are avoided. After milling, the particles can be effectively dispersed in the solvent solution of polymeric binder using a conventional mixing device such as a media mill or a paint shaker to form the coating composition.

The method of this invention can be applied to any of the wide variety of crude perylene pigments well known to those skilled in the art to be useful in electrophotography. It can be applied to mixtures of two or more pigments but optimum electrophotographic properties are generally obtained when pigments are separately milled and added to the coating compositions which is subjected to conventional mixing techniques prior to dispersion coating the electrophotographic element. The method of this invention is particularly useful in providing photoconductive perylene tetracarboxylic acid derivatives having excellent speed in the form of finely-divided stable dispersions. Moreover, it has been our experience that 3,4,9,10-tetracarboxylic acid imide derivatives containing phenethyl radical and/or fused imidazo[1,2-a]pyridino ring moieties are particularly difficult to effectively disperse in coating compositions in a form having high electrophotographic speed. The method of this invention is effective with such derivatives, including those represented by the following formula:

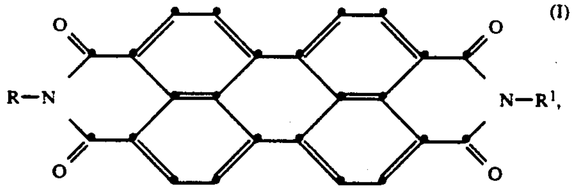

(I)

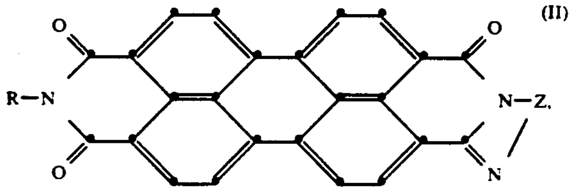

(II)

or

-continued

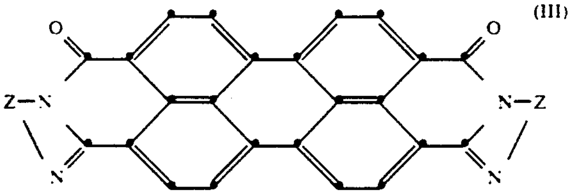

(III)

where each R is a phenethyl radical, $R^1$ is hydrogen, alkyl, cycloalkyl, aralkyl, aryl, heteroaryl, alkoxy, mono- or dialkylamino, or when the compound of formula I is a dimer, $R^1$ is 1,4-phenylene, each Z is 2,3-naphthylene, 2,3-pyridylene, 3,4-pyridylene, 3,4,5,6-tetrahydro-1,2-phenylene, 9,10-phenanthrylene, 1,8-naphthylene, the radical

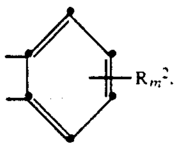

where $R^2$ is alkyl, cycloalkyl, aralkyl, aryl, heteroaryl, alkoxy, dialkylamino, halogen, cyano, or nitro, or when the compound of formula II is a dimer, Z is 1,2,4,5-benzenetetrayl or 3,3',4,4'-biphenyltetrayl, and m is a number from 0 to 4.

Such perylene pigments can be symmetrical or asymmetrical depending upon the nature of the specific substituents, for example, the $R^1$ or Z radicals in a given formula. Also, while formula III specifically sets forth the cis form of the perylene pigment, other forms such as trans forms do exist and such forms of the pigments are included within the scope of this invention.

The R radical in formula I or II is a phenethyl radical, i.e., a radical in which an ethylene linkage joins a phenyl moiety to a 3,4-dicarboximide nitrogen atom. The ethylene linkage and/or phenyl moiety can be unsubstituted or can contain substituents that do not deleteriously affect the photoconductive properties of the perylene pigment. Suitable substituents of this type include for example, alkyl radicals, such as methyl, ethyl, propyl, isopropyl, butyl, isobutyl, sec-butyl and tert-butyl; cycloalkyl radicals such as cyclopropyl, cyclobutyl, cyclopentyl and cyclohexyl; aralkyl radicals such as benzyl and phenethyl; aryl radicals such as phenyl, chlorophenyl, anisyl, biphenyl and naphthyl; heteroaryl radicals such as pyridyl, pyrimidyl, thiophenyl, pyrrolyl and furyl; alkoxy radicals such as methoxy and ethoxy; dialkylamino radicals containing the same or different alkyls such as dimethylamino, diethylamino, and methylbenzylamino; and halogen such as chlorine, bromine or fluorine. In addition to the specific $R^1$ radicals set forth in formula I, illustrative $R^1$ substituents include alkyl radicals such as methyl, ethyl, propyl, butyl, pentyl, hexyl, methoxyethyl and methoxypropyl; cycloalkyl radicals such as cyclopropyl, cyclobutyl, cyclopentyl and cyclohexyl; aralkyl radicals such as benzyl, phenethyl, phenylpropyl and phenylbutyl; aryl radicals such as phenyl, tolyl, xylyl, biphenylyl and naphthyl; and heteroaryl radicals such as pyridyl and pyrimidyl.

Some illustrative $R^2$ substituents in formulas II and III include alkyl radicals, such as methyl, ethyl, propyl, isopropyl, butyl, isobutyl, sec-butyl, and tert-butyl; cycloalkyl radicals such as cyclopropyl, cyclobutyl, cyclopentyl and cyclohexyl; aralkyl radicals such as benzyl and phenethyl; aryl radicals such as phenyl, chlorophenyl, anisyl, biphenyl and naphthyl; heteroaryl radicals such as pyridyl, pyrimidyl, thiophenyl, pyrrolyl and furyl; alkoxy radicals such as methoxy and ethoxy; dialkylamino radicals containing the same or different alkyls such as dimethylamino, diethylamino, and methylbenzylamino; and halogen such as chlorine, bromine or fluorine.

As illustrated by the previous description of formulas I, II and III and the following Tables 1, 2 and 3, the specific R, $R^1$ and $R^2$ radicals are not critical to the operation of the invention and include those radicals that are well known to those skilled in the art to provide desired characteristics such as compatibility in a specific electrophotographic composition. Although such radicals generally contain only carbon and hydrogen, they often contain additional atoms such as oxygen, nitrogen, sulfur and halogen. It is also evident from the previous description of formula II and III and the following Tables 2 and 3 that the imidazo[1,2-a]-pyridino ring moiety (which includes the Z substituent) in the photoconductive perylene pigments employed in the practice of this invention can contain a wide variety of substituents, including fused ring systems of carbon or of carbon and hetero atoms, each ring containing 5 or more carbon or carbon and hetero atoms such as fused benzene, naphthalene, pyrimidine or pyridine rings.

Symmetrical perylene 3,4,9,10-tetracarboxylic acid imide derivatives that can be used in the practice of this invention are conveniently prepared by cyclizing perylene tetracarboxylic dianhydrides with an excess of suitable organic amines such as phenylethyl amine or diaminonaphthalene. Typical procedures are described in U.S. Pat. No. 4,156,757, issued May 29, 1979, and in U.S. Pat. No. 4,578,334 and U.S. Pat. No. 4,792,508, referred to previously herein. Typical procedures for preparing asymmetrical perylene-3,4,9,10-tetracarboxylic acid imide derivatives employed in the practice of this invention are described in U.S. Pat. No. 4,714,666, previously referred to herein. Synthesis of dimeric phenylene-3,4,9,10-tetracarboxylic acid imide derivatives can be carried out by methods analogous to those described in U.S. Pat. No. 4,714,666 except that at least 2 moles of a perylene tetracarboxylic acid monoanhydride monoimide is cyclized by reaction with 1 mole of an appropriate polyfunctional organic amine such as 1,4-phenylenediamine or 1,2,4,5-benzenetetraamine.

A partial listing of perylene pigments of formula I that can be used in the practice of this invention is set forth in the following Table 1 where R and $R^1$ in that formula I are set forth.

TABLE 1
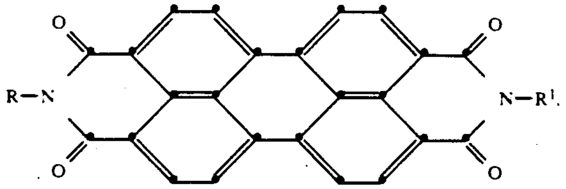
(I)
| Pigment | R | $R^1$ |
|---|---|---|
| P-1 | 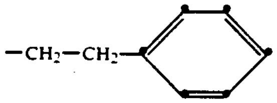 | 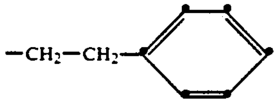 |
| P-2 | 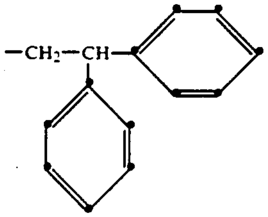 | 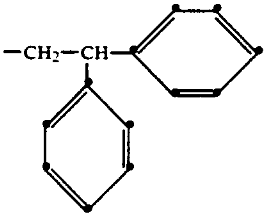 |
| P-3 | 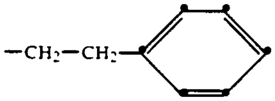 | 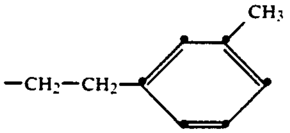 |
| P-4 | 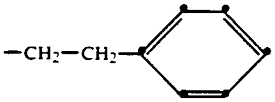 | $-CH_2CH_2CH_3$ |
| P-5 | 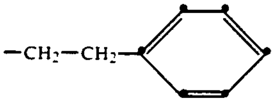 | 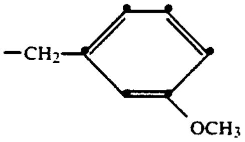 |
| P-6 | 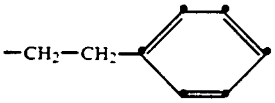 | $-CH_2CH_2CH_2OCH_3$ |
| P-7 | 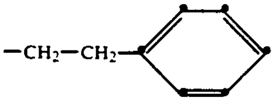 | $-H$ |
| P-8 | 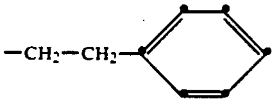 | 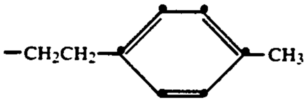 |
| P-9 | 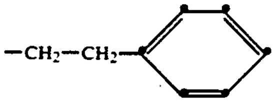 | $-CH_2CH_2OCH_3$ |
| P-10 | 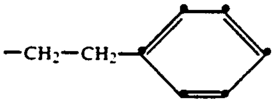 | $-CH_2CH_2CH_2SCH_3$ |

TABLE 1-continued
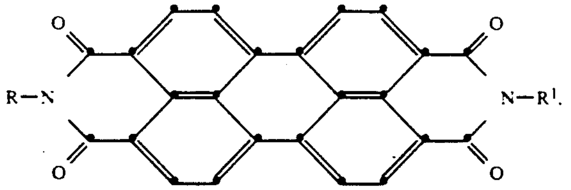
(1)
| Pigment | R | $R^1$ |
|---|---|---|
| P-11 | 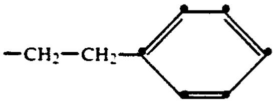 | 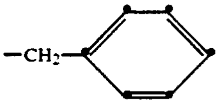 |
| P-12 | 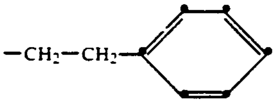 | 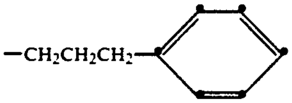 |
| P-13 | 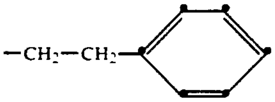 | 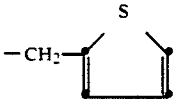 |
| P-14 | 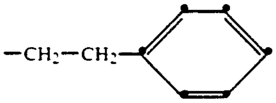 | 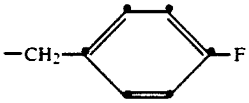 |
| P-15 | 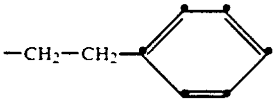 | 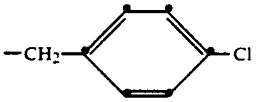 |
| P-16 | 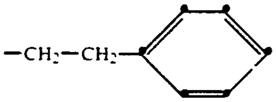 | 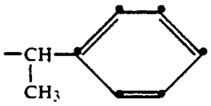 |
| P-17 | 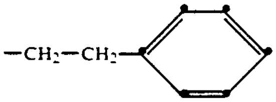 | 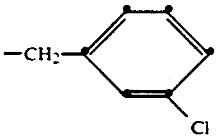 |
| P-18 | 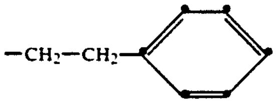 | $-CH_3$ |
| P-19 | 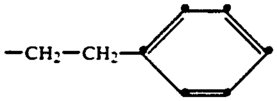 | 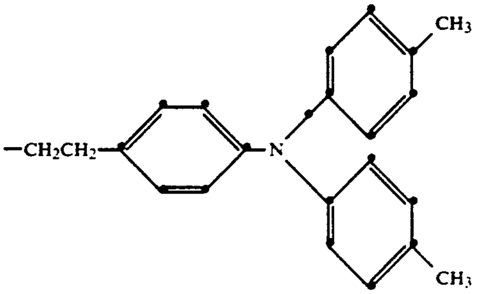 |

TABLE 1-continued
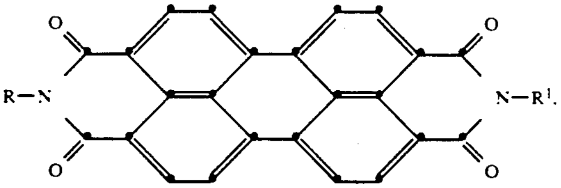
(I)
| Pigment | R | R¹ |
|---|---|---|
| P-20 | 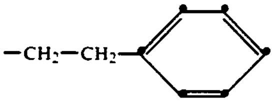 | 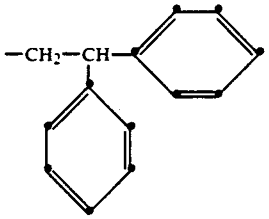 |
| P-21 | 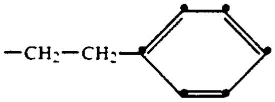 | 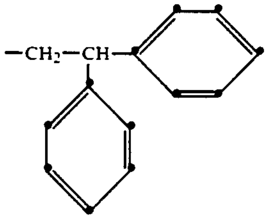 |
| P-22 | 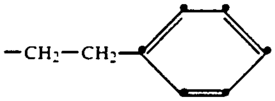 | 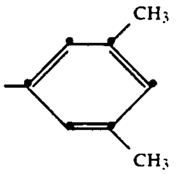 |
| P-23 | 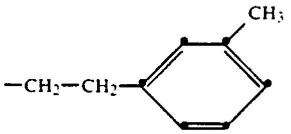 | $-CH_2CH_2CH_2OCH_3$ |
| P-24 | 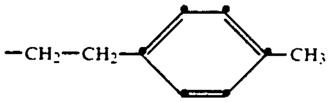 | $-CH_2CH_2CH_2OCH_3$ |
| P-25 | 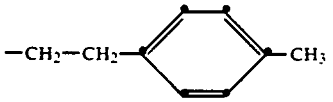 | 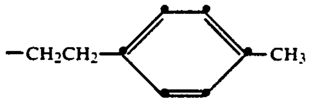 |
| P-26 | 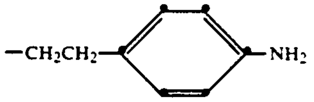 | 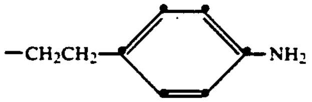 |
| P-27 | 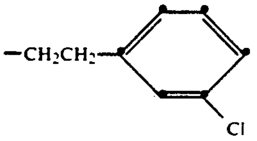 | 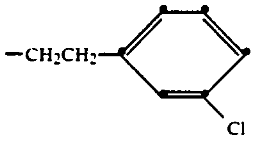 |

TABLE 1-continued
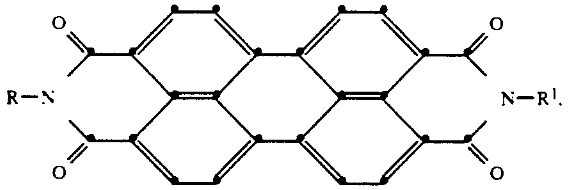
(I)
| Pigment | R | $R^1$ |
| --- | --- | --- |
| P-28 | 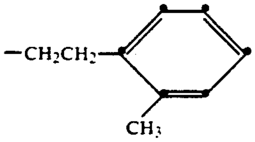 | 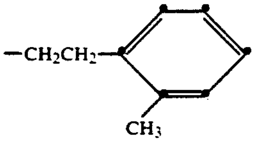 |
| P-29 | 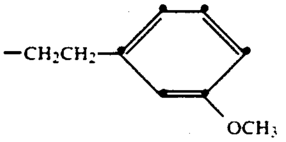 | 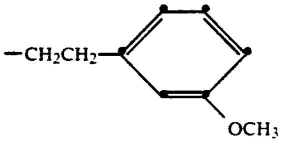 |
| P-30 | 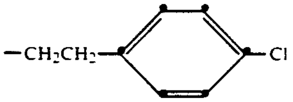 | 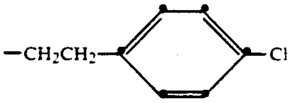 |
| P-31 | 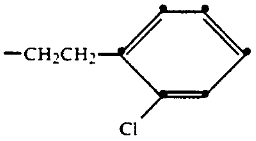 | 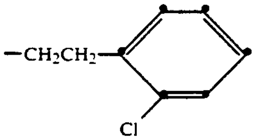 |
| P-32 | 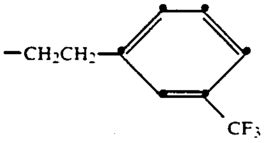 | 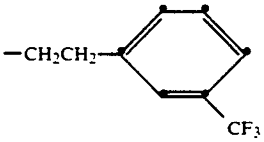 |
| P-33 | 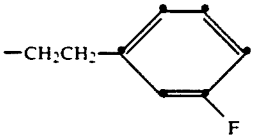 | 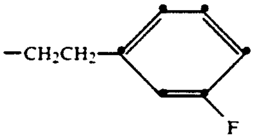 |
| P-34 | 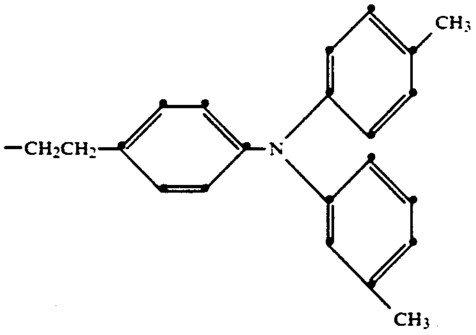 | 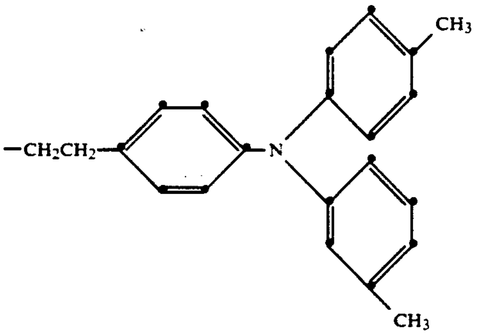 |
| P-35 | 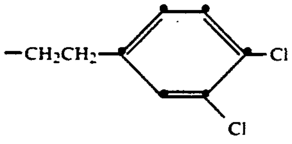 | 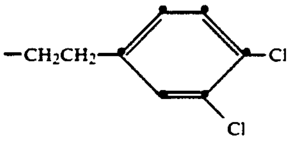 |

TABLE 1-continued
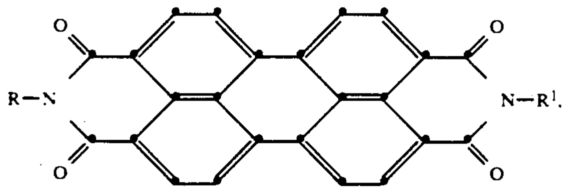
(I)
| Pigment | R | R¹ |
|---|---|---|
| P-36 | 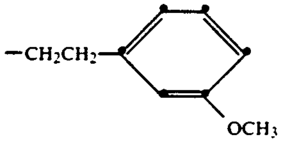 | 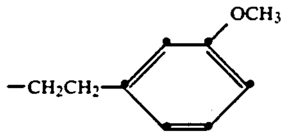 |
| P-37 | 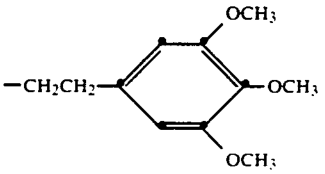 | 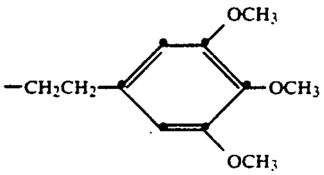 |
A partial listing of perylene pigments of formula II that can be used in the practice of this invention is set forth in the following Table 2. In each case R in formula II is phenethyl and Z, $R^2$ and m are as defined in the Table.
TABLE 2
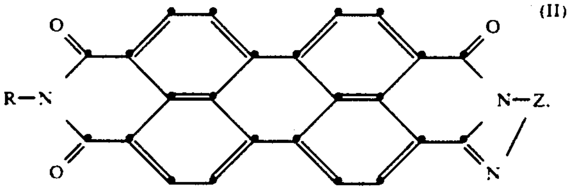
(II)
or
| Pigment | Z | $R^2$ | m |
|---|---|---|---|
| P-38 | 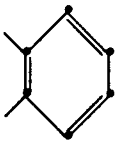 | — | — |
| P-39 | 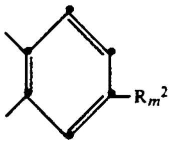 | $CH_3$ | 1 |
| P-40 | 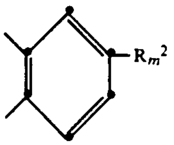 | Cl | 1 |
TABLE 2-continued
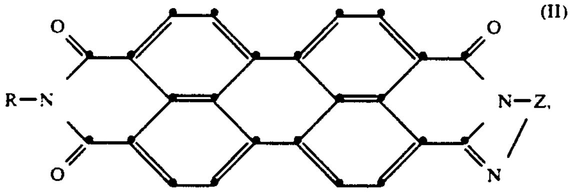
(II)
or
| Pigment | Z | $R^2$ | m |
|---|---|---|---|
| P-41 | 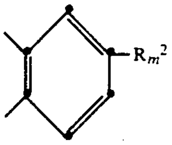 | $NO_2$ | 1 |
| P-42 | 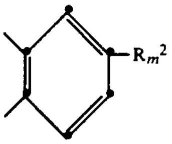 | F | 1 |
| P-43 | 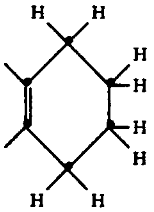 | — | — |
| P-44 | 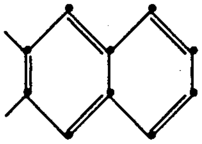 | — | — |

TABLE 2-continued
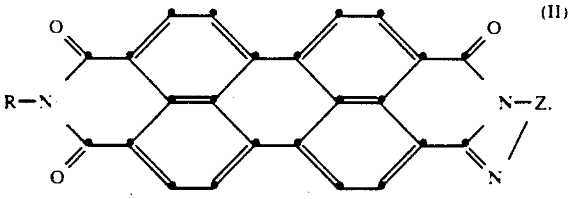
(II)
or
| Pigment | Z | $R^2$ | m |
|---|---|---|---|
| P-45 | 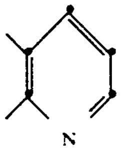 | — | — |
| P-45a | 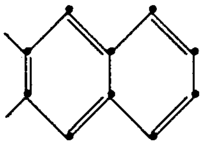 | — | — |
| P-46 | 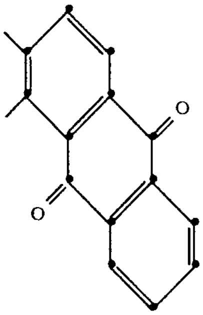 | — | — |
| P-47 | 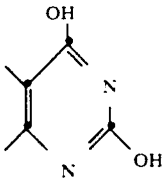 | — | — |
| *P-48 | 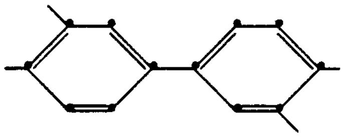 | — | — |
| *P-50 | 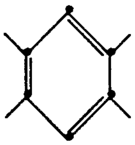 | — | — |
*Dimers
A partial listing of perylene pigments of formula III that can be used in the practice of this invention is set forth in the following Table 3 where each Z is the same and, $R^2$ and m in formula III are as defined.
TABLE 3
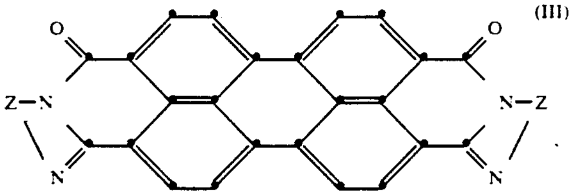
(III)
| Pigment | Z | $R^2$ | m |
|---|---|---|---|
| P-51 | 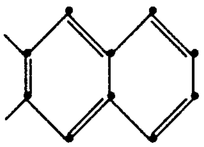 | — | — |
| P-52 | 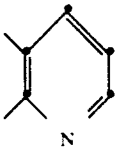 | — | — |
| P-53 | 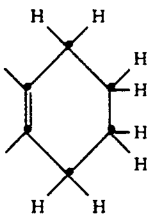 | — | — |
| P-54 | 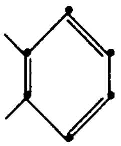 | — | — |
| P-55 | 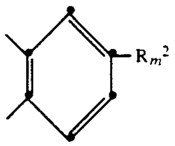 | Cl | 1 |
| P-56 | 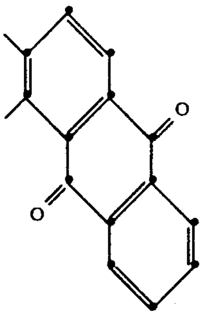 | — | — |
| P-58 | 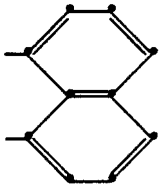 | — | — |

During the first stage of the method of this invention, the perylene pigment is mechanically ground in the dry state under shear conditions that break up particle agglomerates and provide particles having a very small size. As synthesized, perylene pigments normally have a particle size that is too large for them to be effectively used in electrophotographic applications. In this condition, they are known in the prior art as "crude" pigments. Such crude pigments normally have a particle size in excess of 10 micrometers, often a particle size in the range of about 50 to 100 micrometers and, in some cases, at least 1 millimeter. In this first milling stage, the particle size is reduced to an particle size that does not exceed about 0.2 micrometer, typically a particle size of about 0.02 to 0.2 micrometer and often about 0.05 to 0.1 micrometer. The pigment particles have a variety of shapes, e.g., elongated, needle-like, spherical, regular or irregular. The particle size referred to herein is the largest dimension of the particle and can be readily determined from electron photomicrographs using techniques well known to those skilled in the art. Milling is carried out in the substantial absence of the solvent and the polymeric binder, i.e., there is either none of these ingredients present or, if some polymeric binder and/or solvent is included, it is in an amount so small as to have no significant detrimental effect on the the pigment particles.

In the first stage of the method, the perylene pigment particles are milled under shear such that the particle size of the pigment is reduced to at least 0.2 micrometer and the pigment and milling media form a homogeneous mixture. Milling apparatus capable of providing such shear with the milling mixture are well known and include, e.g., conventional ball mills, roll mills, paint shakers, vibrating mills and the like. Examples of milling apparatus that can utilize shearing are described in U.S. Pat. Nos. 4,555,467, issued Nov. 26, 1985 and 3,752,686, issued Aug. 14, 1973. The shear employed with a given mixture is subject to variation, as is obvious to those skilled in the art, depending upon such things as the type of milling apparatus, milling media and perylene pigment selected. However, the energy applied to the non-conductive particles in the milling media which results in appropriate shear in the first milling stage generally does not exceed about 5 watts, and is typically in the range of about 3 to 5 watts.

The milling media used in the method of this invention comprises two components, i.e., inorganic salt particles and non-conducting particles in a weight ratio of about 0.5:1 to 3:1, typically about 1:1 to 2:1. Examples of inorganic salts include alkali metal halides, carbonates, sulfates or phosphates such as sodium chloride, potassium bromide, sodium sulfate, potassium sulfate, sodium carbonate, and sodium phosphate. In prior art milling methods where such inorganic salt particles are used in milling media with other particles, e.g., steel balls, they are normally used as milling aids at considerably lower concentrations. Such salts are typically separated from the milled pigment by washing with water since they often have a high degree of solubility in water, e.g., a solubility of at least 200 and often 400 grams of salt per liter of water. Examples of non-conductive particles include materials such as glass particles, zirconium oxide particles and organic polymeric beads such as polymethyl methacrylate beads that are electrically non-conducting. Non-conductive particles are employed because they do not acquire charges due to triboelectrification which charges would cause pigment to adhere to the particles. Furthermore, the use of non-conductive particles avoids corrosion due to the presence of the inorganic salt particles that might otherwise occur under the milling conditions. The inorganic salts typically have particle sizes in the range of about 5 to 500 micrometers while the particle size of the non-conducting particles is normally in the range of about 0.05 mm to about 5 mm.

Following comminution of the crude pigment in the first milling stage, milling is continued in a second stage at higher shear and at a temperature up to 50° C. Milling is continued at least until there is a perceptible color change of the pigment. This is the point at which there is a just noticeable difference in the color of the pigment which can be detected by observation with the unaided human eye. It is also interesting to note that the perylene pigment is substantially completely adsorbed to the surfaces of the inorganic salt particles when milling is completed. This is an excellent indicator of milling completion. During this second milling stage, shear can be increased simply by increasing the concentration of milling media. However, it is often convenient to simply transfer the milled composition from the first stage milling (comprising pigment and milling media) to a device that will develop increased shear relative to the shear used in the first stage. For example, where a ball mill is used is the first stage, this can be followed by using an attritor in the second milling stage, as illustrated in the following Examples. However, other devices such as jet mills or high speed roll mills are suitable for use for the second milling stage. The milling temperature in the second stage does not exceed about 50° C. and is generally in the range of about 0° C. to 50° C., typically in the range of about 20° C. to about 45° C. The milling time, in stages 1 and 2 will vary greatly, depending upon a number of factors such as the relative proportions of pigment and milling media and the specific milling equipment utilized. Generally, a suitable time for the stage 1 milling may be as much as 240 hrs. with typical times being in the range of about 72 hrs. to 120 hours, while, in the second stage, the milling time is generally about 10 min. to 5 hrs., often about 30 min. to 90 min. Typically, the concentration of the perylene pigment during milling is about 0.01% to 10%, often about 0.5% to 5%, by weight, based on the weight of milling media. The milling operation tends to result in a liberation of heat which raises the temperature of the milling composition, i.e., the mixture of pigment and milling media. The milling apparatus is, therefore, normally equipped with cooling means to keep the temperature below 50° C.

Upon completion of stage 2 milling, the temperature of the milled pigment is rapidly reduced by at least 10° C., often by 10° C. to 60° C. The rapid reduction in temperature stabilizes the pigment against changes in morphology and crystal form prior to its addition to the solvent solution of polymeric binder. It is usually convenient to reduce the temperature of the milled mixture by quenching with water, for example, ice water or room temperature water depending upon the temperature of the milled mixture. However, other cooling means, for example, ice or cold air, can be used, but water is preferred since it dissolves the inorganic salt particles which facilitates recovery of the pigment. The non-conducting solid particles can be removed from the mixture using any suitable means such as filtration or centrifuging.

Following separation of the milled pigment from the milling media, the pigment is mixed with a solvent solution of polymeric binder to form an electrophotographic coating composition. The pigment can be mixed with the solvent solution of polymeric binder immediately or it can be stored for some period of time before making up the coating composition. The polymeric binder used in the preparation of the coating composition can be any of the many different binders that are useful in the preparation of electrophotographic layers. Representative materials that can be employed as binders in the practice of this invention are film-forming polymers having a fairly high dielectric strength and good electrically insulating properties. Such binders include, for example, styrene-butadiene copolymers; vinyl toluene-styrene copolymers; styrene-alkyd resins; silicone-alkyd resins; soya-alkyd resins; vinylidene chloride-vinyl chloride copolymers; poly(-vinylidene chloride); vinylidene chloride-acrylonitrile copolymers; vinyl acetate-vinyl chloride copolymers; poly(vinyl acetals), such as poly(vinyl butyral); nitrated polystyrene; poly(methylstyrene); isobutylene polymers; polyesters, such as poly[ethylene-coalkylenebis-(alkyleneoxyaryl)phenylenedicarboxylate]; phenol-formaldehyde resins; ketone resins; polyamides; polycarbonates; polythiocarbonates; poly[ethylene-coisopropylidene-2,2-bis(ethyleneoxyphenylene)-terephthalate]; copolymers of vinyl haloacrylates and vinyl acetate such as poly(vinyl-m-bromobenzoate-covinyl acetate); chlorinated poly(olefins), such as chlorinated poly(ethylene); cellulose derivatives such as cellulose acetate, cellulose acetate butyrate and ethyl cellulose; and polyimides, such as poly[1,1,3-trimethyl-3-(4'-phenyl)-5-indane pyromellitimide].

Suitable organic solvents for forming the polymeric binder solution can be selected from a wide variety of organic solvents, including, for example, aromatic hydrocarbons such as benzene, toluene, xylene and mesitylene; ketones such as acetone, butanone and 4-methyl-2-pentanone; halogenated hydrocarbons such as methylene chloride, chloroform and ethylene chloride; ethers, including ethyl ether and cyclic ethers such as dioxane and tetrahydrofuran; and mixtures thereof. The amount of solvent used in forming the binder solution is typically in the range of from about 2 to about 100 parts of solvent per part of binder by weight, and preferably in the range of from about 10 to about 50 parts of solvent per part of binder by weight.

As previously indicated herein, the electrophotographic elements prepared using coating compositions prepared according to this invention can be of various types, all of which contain photoconductive perylene derivative that serve as charge-generating materials in the elements. Such elements include both those commonly referred to as single layer or single-active-layer elements and those commonly referred to as multiactive, multilayer, or multi-active-layer elements which have been briefly referred to previously herein.

Single layer elements contain one layer that is active both to generate and to transport charges in response to exposure to actinic radiation. Such elements typically comprise at least an electrically conductive layer in electrical contact with a photoconductive layer. In single layer elements prepared using a coating composition made according to this invention, the photoconductive layer contains at least one photoconductive perylene pigment as the charge-generation material to generate charge in response to actinic radiation and a transport material which is capable of accepting charges generated by the charge-generation material and transporting the charges through the layer to effect discharge of the initially uniform electrostatic potential. The photoconductive layer is electrically insulative, except when exposed to actinic radiation, and contains an electrically insulative film-forming polymeric binder.

Multiactive elements contain at least two active layers, at least one of which is capable of generating charge in response to exposure to actinic radiation and is referred to as a charge-generation layer (hereinafter also referred to as a CGL), and at least one of which is capable of accepting and transporting charges generated by the charge-generation layer and is referred to as a charge-transport layer (hereinafter also referred to as a CTL). Such elements typically comprise at least an electrically conductive layer, a CGL, and a CTL. Either the CGL or the CTL is in electrical contact with both the electrically conductive layer and the remaining CGL or CTL. The CGL contains at least a photoconductive material that serves as a charge-generation material; the CTL contains at least a charge-transport material; and either or both layers can contain an additional film-forming polymeric binder. In multiactive elements prepared using the coating compositions prepared according to this invention the charge-generation material is at least one photoconductive perylene pigment dispersed in a polymeric binder and the element contains a CTL. Any suitable charge-transport material can be used in such CTL's.

Single layer and multilayer electrophotographic elements and their preparation and use, in general, are well known and are described in more detail, for example, in U.S. Pat. Nos. 4,701,396; 4,714,666; 4,666,802; 4,578,334; 4,175,960; 4,514,481; and 3,615,414, the disclosures of which are hereby incorporated herein by reference.

In preparing single-active-layer electrophotographic elements of the invention, the components of the photoconductive layer, including any desired addenda, can be dissolved or dispersed in the coating composition prepared according to this invention and then coated on an electrically conductive layer or support. The solvent for the polymeric binder is then allowed or caused to evaporate from the mixture to form the permanent layer containing from about 0.01 to 50 weight percent of the charge-generation material and about 10 to 70 weight percent of a suitable charge transport material.

In preparing multiactive electrophotographic elements, the components of the CTL can similarly be dissolved or dispersed in the coating composition and can be coated on either an electrically conductive layer or support or on a CGL previously similarly coated or otherwise formed on the conductive layer or support. In the former case a CGL is thereafter coated on the CTL.

Various electrically conductive layers or supports can be employed in electrophotographic elements prepared using a coating composition prepared according to this invention, such as, for example, paper (at a relative humidity above 20 percent); aluminum-paper laminates; metal foils such as aluminum foil and zinc foil; metal plates such as aluminum, copper, zinc, brass and galvanized plates; vapor deposited metal layers such as silver, chromium, vanadium, gold, nickel, and aluminum; and semiconductive layers such as cuprous iodide and indium tin oxide. The metal or semiconductive layers can be coated on paper or conventional photographic film bases such as poly(ethylene terephthalate), cellulose acetate and polystyrene. Such conducting materials as chromium and nickel can be vacuum-deposited on transparent film supports in sufficiently thin layers to allow electrophotographic elements prepared therewith to be exposed from either side.

When a photoconductive layer of a single-active-layer element or a CGL of a multiactive element is coated from a coating composition prepared according to this invention, the polymeric binder may, if it is electrically insulating, help to provide the element with electrically insulating characteristics. It also is useful in coating the layer, in adhering the layer to an adjacent layer, and when it is a top layer, in providing a smooth, easy to clean, wear-resistant surface. A significant feature of this invention is that a CGL formed from a coating composition prepared according to this invention contains a photoconductive perylene pigment in a polymeric binder and, therefore exhibits a surface that is much more durable than a comparable layer containing the same perylene pigment but formed by vacuum sublimation. This is advantageous in manufacturing operations where such a CGL is subjected to handling prior to overcoating with, for example, a CTL.

The optimum ratio of charge-generation material to polymeric binder may vary widely depending upon the particular materials employed. The charge generating material can be a single pigment or it can be two or more pigments prepared according to the method of this invention. In general, useful results are obtained when the amount of active charge-generation material contained within the layer is within the range of from about 0.01 to 90 weight percent, based on the dry weight of the layer.

Electrophotographic recording elements prepared using coating compositions made according to this invention can optionally contain other addenda such as leveling agents, surfactants, plasticizers, sensitizers, contrast-control agents, and release agents and they can be coated using the coating composition described herein using any of the wide variety of coating techniques known in the art for forming such elements. Also, such elements can contain any of the optional additional layers known to be useful in electrophotographic recording elements in general, such as, e.g., subbing layers, overcoat layers, barrier layers, and screening layers.

The following examples are presented to further illustrate the invention. For convenience, the perylene pigments are identified in such examples by the "P" number corresponding to that pigment in Table 1, 2 or 3, as previously described.

EXAMPLE 1

A ball mill of 4 liters capacity was charged with 1800 g of glass beads with a diameter of 2 mm and 1800 g of sodium chloride particles having a diameter of 500 micrometers and 180 g of black P-1 pigment having an average particle size of 1 mm. The mixture was then sheared by milling for 10 days at a temperature of 21° C. The resulting mixture was homogeneous and contained black P-1 pigment that had a particle size of 0.2 micrometer.

The milled mixture obtained from the first stage was transferred to an attritor dry grinding vessel having 10 liters capacity and containing a stirrer having a rotating shaft containing 2 pairs of arms fixed to the rotating shaft and extending toward the side wall of the vessel. 2330 g more of the glass beads and 2058 g more of the sodium chloride particles were added to the attritor and the mixture was agitated at 500 rpm for 90 minutes at a temperature of 21° C. These conditions increased the shear on the mixture in comparison to the first stage. The P-1 pigment changed from black to a bright red color and was adhered to the surface of the inorganic salt particles. The glass beads were removed from the mixture and the pigment and salt particles were stirred rapidly in ice for 2 hours. The resulting pigment-sodium chloride mixture was stored at 0° C. for approximately 48 hours, washed free of sodium chloride with distilled water and dried at room temperature. The separated P-1 pigment was bright red, had a particle size of 0.2 micrometer and exhibited peaks at diffraction angles (2Θ) of 24.3°, 22.8°, and 13.5° in the X-ray diffraction pattern obtained with CuKα radiation. In comparison, the crude pigment exhibited a more crystalline diffraction pattern with diffraction peaks at 6.2°, 9.5°, and 13.4°.

A coating composition for forming a charge-generation layer (CGL) was prepared by adding 3.5 g of the P-1 pigment particles and 1 g of polyvinylbutyral binder to 30 g of methylisobutyl ketone and ball milling for 72 hours. The composition was diluted to 4.5 percent solids with methylisobutyl ketone. The resulting dispersion was coated on a conductive support comprising a thin conductive layer of nickel on poly(ethylene terephthalate) film to provide a CGL of 1.2 micrometer thickness.

A coating composition for forming a charge-transport layer (CTL) was prepared comprising 11 weight percent solids dissolved in dichloromethane. The solids comprised 4 g of 1,1-bis(4-di-p-tolylaminophenyl)-3-phenylpropane, a charge-transport material, and 6 g of a binder comprising bisphenol A polycarbonate. The coating composition was coated onto the CGL and dried to a thickness of 20 micrometers. The resulting multi-active layer electrophotographic recording element was then charged to a uniform potential of −500V, exposed at its maximum absorption wavelength of 630 nm and discharged to −100 V. The energy required in ergs/cm$^2$ (photodecay) was 3.2 ergs/cm$^2$. The dark discharge rate for the element (dark decay) observed 10 seconds after charging was 1 V/sec. Photomicrographs of the electrophotographic recording elements showed no evidence of photoconductive pigment agglomerates.

For comparison purposes, this example was repeated except that the second stage milling was carried out with a paint shaker having a capacity of 1.2 liters for 2 days instead of with the attritor for 90 minutes. The P-1 pigment particles obtained were bright red and had a particle size substantially in excess of 0.2 micrometer, i.e., a particle size of 0.5 micrometer. The particles also comprised a large number of particle agglomeratess. The electrophotographic element prepared using these particles and tested according to the procedure described previously in this Example 1 had a photodecay of 9 ergs/cm$^2$ and a dark decay of 10 V/sec. Clearly, the use of low shear milling in two stages does not provide the high quality electrophotographic coating compositions obtained by the practice of this invention.

In another comparison, the procedures of this Example 1 were repeated except that the P-1 pigment particles were not subjected to any second stage milling. The resulting P-1 pigment was black, had a particle size of 0.5 micrometer and comprised many agglomerated particles. The multi-active electrophotographic recording element prepared using these particles and tested according to this Example 1 had a photodecay of 13 ergs/$cm^2$ and a dark decay of 3 V/sec. This clearly illustrates that the two stage milling method of this invention provided superior electrophotographic coating composition.

EXAMPLE 2

The rapid reduction of the temperature of the pigment after milling by at least 10° C. is a significant feature of this invention. To illustrate, the procedure of Example 1 is repeated except that water having temperatures of 0° C., 20° C. and 90° C. respectively, was used in three runs to reduce the temperature of the pigment after milling. The photodecay values for the electrophotographic elements obtained were 3.2, 4.5 and 7 ergs/$cm^2$, respectively. Thus, there was significant loss in electrophotographic speed as the temperature of the water contacting the milled pigment increased from 0° to 90° C.

EXAMPLE 3

The temperature used in this invention for the second stage milling at higher shear does not exceed about 50° C. To illustrate the significance of this feature of the invention, the procedure of Example 1 was repeated except that no cooling was applied to the attritor and the temperature of the mixture was permitted to increase to between 80° and 100° C. during the second stage milling. As a result, the milled P-1 pigment particles retained their black color and the electrophotographic element prepared with these particles and tested according to the procedure of Example 1 had a photodecay of 13 ergs/$cm^2$ and a dark decay of 3 V/sec. In comparison, the electrophotographic element of Example 1 had a photodecay of 3.2 ergs/$cm^2$, i.e., a 4-fold increase in electrophotographic speed, and a dark decay of only 1 V/sec.

EXAMPLE 4

The procedure of Example 1 was repeated except that zirconium oxide beads having a diameter of approximately 2 to 3 millimeters were used in place of the glass beads. The electrophotographic element prepared with P-1 pigment particles prepared using the zirconium oxide beads in place of the glass beads and tested according to the procedure of Example 1 had a photodecay of 4.3 ergs/$cm^2$ and a dark decay of 3 V/sec.

EXAMPLE 5

The milling media employed in the practice of this invention is a combination of inorganic salt particles and non-conducting particles. To illustrate the significance of using this combination of particles, the procedure of Example 1 was repeated except that in one run only the glass beads were used as the milling media and in a second run, only the inorganic salt was used as the milling media. The electrophotographic elements coated from the P-1 pigment dispersions prepared with these milling media and tested according to the procedure of Example 1 had the photodecay and dark decay values reported in the following Table. For comparison purposes, photodecay and dark decay values of the element obtained in Example 1 are also set forth.

TABLE

| Milling Media | Photodecay (ergs/$cm^2$) | Dark decay (V/sec) |
|---|---|---|
| glass beads plus sodium chloride | 3.2 | 1 |
| glass beads | 12 | 2 |
| sodium chloride | 14 | 4 |

A comparison between the photodecay and dark decay values reported in the above Table clearly illustrates that the use of the combination of inorganic salt and non-conducting particles as the milling media in the method of this invention provides electrophotographic coating dispersions exhibiting a significant and unexpected increase in photosensitivity as well as improved dark decay, in comparison to the use of the single components of the combination. Also, there is a decrease in photosensitivity comparable to that experienced with the use of the single components of the combination when the concentration of the inorganic salt falls below a weight ratio of about 0.5:1 with respect to the non-conductive particles.

EXAMPLE 6

The procedure of Example 1 was repeated except that potassium bromide particles having a particle size of 500 micrometers were used in place of the sodium chloride particles in the milling media. The electrophotographic element prepared with P-1 particles milled with the media containing potassium bromide particles and tested according to the procedure of Example 1 had a photodecay of 3.3 ergs/$cm^2$ and a dark decay of 1 V/sec.

EXAMPLE 7

The procedure of Example 1 was repeated except that the P-1 perylene pigment was replaced with different perylene pigments. The pigments used and the photodecay values obtained with electrophotographic elements prepared using the pigments and tested according to the procedure of Example 1 are reported in the following Table. For comparison purposes electrophotographic elements were prepared and tested according to the procedure of Example 1 using the corresponding crude pigments and their photodecay values are also reported in the following Table.

TABLE

| Perylene Pigment | Photodecay ergs/$cm^2$ crude | Photodecay ergs/$cm^2$ milled |
|---|---|---|
| P-3 | 8 | 3 |
| P-38 | 30 | 3 |
| P-44 | 18 | 8 |
| P-51 | 70 | 10 |
| P-54 | 35 | 7 |
| P-56 | 50 | 15 |

The photodecay values reported in the above table clearly demonstrate that the method of this invention can be used to significantly improve the photosensitivity of crude perylene pigments. In addition, it was noted that the layer coated using the milled pigments exhibited greatly improved adhesion to the support in comparison to layers coated using the corresponding crude pigments.

The invention has been described in detail with particular reference to preferred embodiments thereof, but it will be understood that variations and modifications can be effected within the spirit and scope of the invention.

We claim:

1. A method of making an electrophotographic coating composition having finely-divided photoconductive pigment dispersed in a solvent solution of polymeric binder comprising:

(1) milling under shear conditions in the substantial absence of said solvent, (a) a crude perylene pigment with (b) milling media comprising inorganic salt and non-conducting particles in a weight ratio of about 0.5:1 to 3:1 to provide perylene pigment having a particle size up to about 0.2 micrometer, (2) continuing said milling at higher shear conditions and at a temperature up to about 50° C. to achieve a perceptible color change of said pigment, (3) quenching the milled pigment to rapidly reduce its temperature by at least 10° C., (4) separating said milled pigment from said media, and (5) mixing said milled pigment with said solvent solution of polymeric binder to form said coating composition.

2. The method of claim 1, wherein the crude perylene pigment in (1) has an initial particle size of at least 10 micrometers.

3. The method of claim 2, wherein the perylene pigment in (b) has a particle size in the range of about 0.05 to 0.1 micrometer.

4. The method of claim 2, wherein the perylene pigment in (b) is black and milling in (2) is continued until said pigment is red.

5. The method of claim 1, wherein the milling temperature in (2) is up to 40° C. and the temperature of the milled pigment in (3) is up to about 25° C.

6. The method of claim 5, wherein the temperature of the milled pigment in (3) is reduced by contacting it with water.

7. The method of claim 1, wherein the inorganic salt particles are sodium halide particles and the non-conducting particles are glass particles.

8. The method of claim 7, wherein the weight ratio in (b) is about 1:1 and the inorganic salt particles are sodium chloride particles.

9. The method of claim 1 wherein the perylene pigment has the formula:

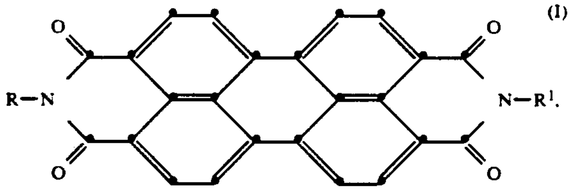

(I)

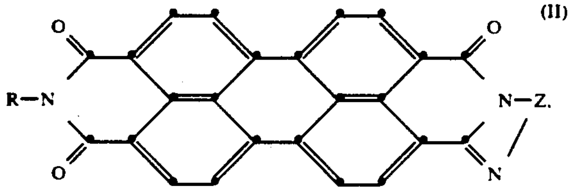

(II)

-continued or

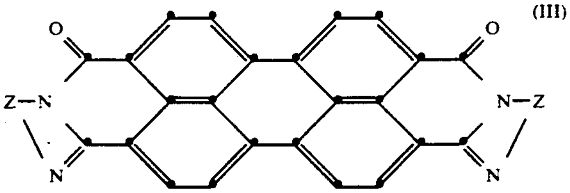

(III)

where each R is a phenethyl radical, $R^1$ is hydrogen, alkyl, cycloalkyl, aralkyl, aryl, heteroaryl, alkoxy, mono- or dialkylamino, or when the compound of formula I is a dimer, $R^1$ is 1,4-phenylene, each Z is 2,3-naphthylene, 2,3-pyridylene, 3,4-pyridylene, 3,4,5,6-tetrahydro-1,2-phenylene, 9,10-phenanthrylene, 1,8-naphthylene, the radical

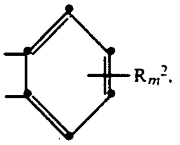

where $R^2$ is alkyl, cycloalkyl, aralkyl, aryl, heteroaryl, alkoxy, dialkylamino, halogen, cyano, or nitro, or when the compound of formula II is a dimer, one Z is 1,2,4,5-benzenetetrayl or 3,3',4,4'-biphenyltetrayl, and m is a number from 0 to 4.

10. The method of claim 9, wherein the perylene pigment has the formula I.

11. The method of claim 10, wherein each of R and $R^1$ is phenethyl.

12. The method of claim 10, wherein R is phenethyl and $R^1$ is m-methyl-substituted phenethyl.

13. The method of claim 9, wherein the perylene pigment has the formula II.

14. The method of claim 13, wherein $R^1$ is phenethyl and Z is the radical

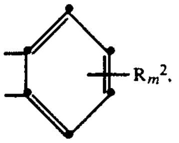

where m is 0.

15. The method of claim 14, wherein each Z is the radical

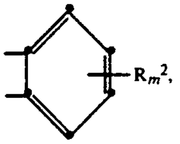

where m is 0.

16. The method of claim 9, wherein the perylene pigment has the formula III.

* * * * *